US009042846B2

(12) United States Patent
Kang et al.

(10) Patent No.: US 9,042,846 B2
(45) Date of Patent: May 26, 2015

(54) PORTABLE RADIO HAVING ACCESSORY INTERFACE

(71) Applicant: Motorola Solutions, Inc., Schaumburg, IL (US)

(72) Inventors: Chul Min Kang, Coral Springs, FL (US); LanTing L. Garra, Sunrise, FL (US); Craig F Siddoway, Davie, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 135 days.

(21) Appl. No.: 13/778,452

(22) Filed: Feb. 27, 2013

(65) Prior Publication Data

US 2014/0242928 A1 Aug. 28, 2014

(51) Int. Cl.
*H04M 1/02* (2006.01)
*H02J 7/00* (2006.01)
*H04M 1/03* (2006.01)
*A45F 5/02* (2006.01)
*A45F 5/00* (2006.01)

(52) U.S. Cl.
CPC ............ *H04B 1/3888* (2013.01); *H02J 7/0042* (2013.01); *H04B 1/3833* (2013.01); *H04M 1/0254* (2013.01); *H04M 1/03* (2013.01); *H04B 1/385* (2013.01); *H04B 1/3883* (2013.01); *H04B 2001/3855* (2013.01); *H04B 2001/3861* (2013.01); *A45F 5/021* (2013.01); *A45F 2005/006* (2013.01); *A45F 2200/0508* (2013.01)

(58) Field of Classification Search
USPC ................ 455/90, 90.3, 90.2, 575.1, 557
See application file for complete search history.

(56) References Cited

U.S. PATENT DOCUMENTS

| 5,757,332 | A | 5/1998 | Hanaoka et al. |
| 7,457,650 | B2* | 11/2008 | Iwai et al. ................ 455/575.7 |
| 7,528,886 | B2 | 5/2009 | Yang |
| 7,530,747 | B2 | 5/2009 | Wang et al. |
| 2004/0204203 | A1* | 10/2004 | Lee ........................... 455/575.1 |
| 2007/0099593 | A1 | 5/2007 | Thone et al. |
| 2011/0234458 | A1 | 9/2011 | Kubo et al. |
| 2012/0019730 | A1 | 1/2012 | Suzuki et al. |

FOREIGN PATENT DOCUMENTS

| EP | 1223682 | A1 | 7/2002 |
| EP | 1855507 | A2 | 11/2007 |
| WO | 02093956 | A1 | 11/2002 |
| WO | 2009089393 | A1 | 7/2009 |

OTHER PUBLICATIONS

Corresponding International Application No. PCT/US2014/016674—International Search Report with Written Opinion, Mailing Date May 16, 2014—11 pages.

* cited by examiner

*Primary Examiner* — Blane J Jackson
(74) *Attorney, Agent, or Firm* — Barbara R. Doutre (57) ABSTRACT

An improved user interface is provided by a portable radio (100) having a housing (102) having a through-hole (110) formed therethough. The through-hole provides a user interface for accommodating a plurality of interchangeable accessories through the incorporation of electrical interface (114) and alignment features (116) within the through-hole.

17 Claims, 9 Drawing Sheets

PORTABLE RADIO HAVING ACCESSORY INTERFACE

FIELD OF THE INVENTION

The present invention relates generally to communication devices and more particularly to communication devices that can accommodate a plurality of accessories.

BACKGROUND

Communication devices, such as portable radios, are utilized in a wide variety of communication environments, such as business, consumer retail, security and the like. A portable, handheld radio is typically housed within a plastic enclosure, and depending on user interface requirements, the housing may offer a keypad, push-to-talk switch, control knobs, speaker grill and display. The desire to integrate additional features must be balanced with the ability to maintain a logistical user interface. Additionally, as more operating features are added to the radio, the ability to provide additional features within limited space constraints presents a challenge to designers. There is a strong desire to minimize protruding forms and in some use-cases it is highly desirable to have small products with smooth surfaces to aide in pocketability.

Accordingly, there is a need for an improved approach to providing additional user features to a housing of a portable communication device.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in an improved housing for a two-way radio providing an accessory interface through-hole, the accessory interface through-hole being adaptable to a plurality of different accessories. The plurality of different accessories may be either electrical or mechanical or a combination of both. Accordingly, the components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Briefly, there is provided herein a portable two-way radio housing which facilitates providing additional user interface features to a communication device by providing a radio housing having a through-hole within the housing, wherein the through-hole provides audio porting in conjunctions with a mechanical and electrical interface for accommodating different types of accessories.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
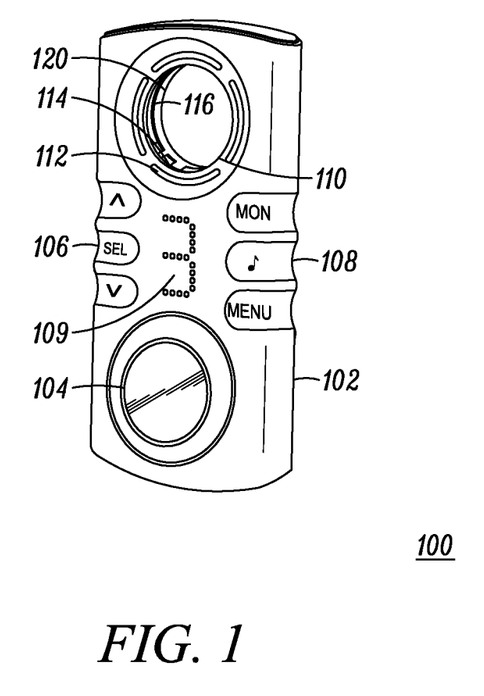
FIG. 1 is a portable two-way radio formed in accordance with the various embodiments.

FIG. 1 is a portable radio 100 formed in accordance with the various embodiments. FIGS. 2-7 show the portable t radio 100 operating with a variety of accessories in accordance with the various embodiments. The portable radio 100 may be a portable two-way radio which comprises a housing 102 having a push-to-talk (PTT) button 104 along with a plurality of function keys 106, 108, and a display 109. The function keys 106, 108 may comprise for example, volume up/down, select and function keys, such as monitor, menu, and tone. Portable radio 100 operates as a handheld device which is preferably sized to fit into the palm of a user and may further be carried in a pocket.

In accordance with the various embodiments, housing 102 further comprises a through-hole 110. The through-hole 110 comprises a circular opening having an interior wall 120 passing from a front surface of the housing 102 to the back surface of the housing thereby forming a pass-through through the housing. The through-hole may be surrounded by audio porting 112. In accordance with the various embodiments, disposed upon the interior wall 120 of the through-hole 110 are electrical interface features 114 and a mechanical interface alignment feature 116. The interface alignment feature 116 may take the form of, for example a slot, a groove, a stop-bump or other alignment feature suitable to the space of the interior wall 120. The electrical interface features may comprise contacts, plug, jack or other suitable electrical interface that can be accommodated within the interior wall 120 of through-hole 110. In accordance with the various embodiments, the through-hole 110 provides a user interface that accommodates a variety of interchangeable accessory devices.

The audio porting 112 surround the through-hole 110 and may be disposed on a sloped surface of the housing 102 leading to the interior wall 120 of the through-hole or may be disposed on a flat surface around the through-hole. The function keys 106, 108 are shown as smooth side grips to minimize protrusions but may be positioned elsewhere on the housing 102. The PTT button 104 may be sized to align with the size of the through-hole with to give the user a balanced visual interface. Alternatively, the PTT button 104 could be placed on a different portion of the housing, such as the side. The housing 102 of portable radio housing 100 is preferably formed of smooth surfaces and may be sized to carry in a pocket.

Figure 2:
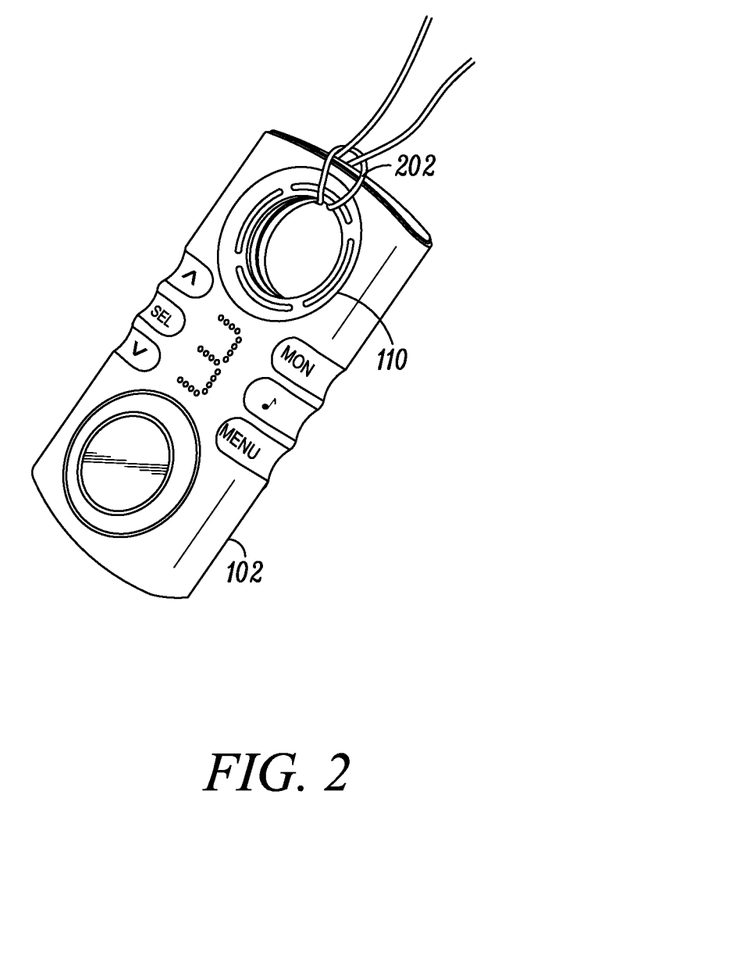
FIG. 2 is the portable two-way radio in accordance with the various embodiments.
Figure 3:
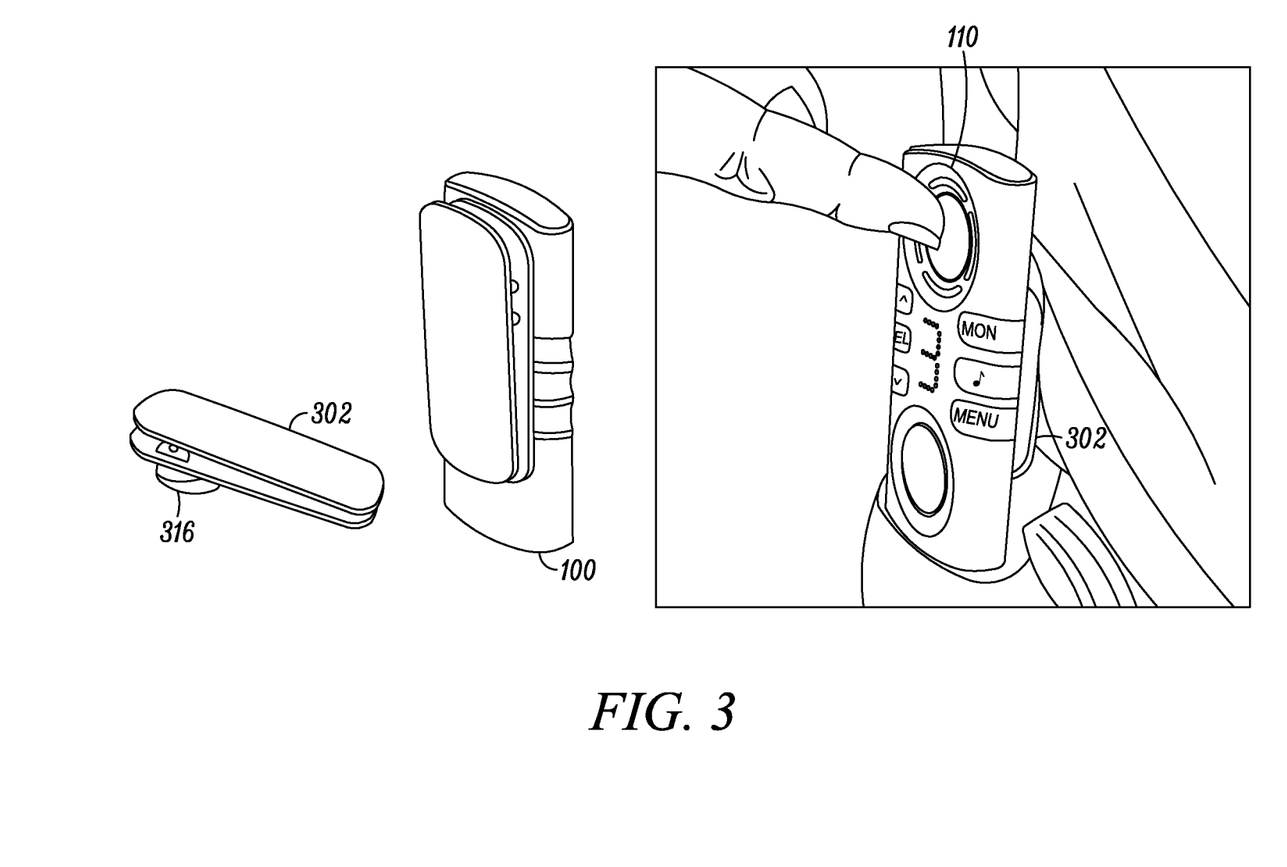
FIG. 3 is the portable two-way radio in accordance with the various embodiments.

FIG. 2 shows portable radio 100 wherein the through-hole 110 operates as a lanyard through which a rope 202, string, or similar device can be used. For users who prefer to carry the device on his/her clothing, the through-hole 110 may also accommodate a belt clip. Such a configuration is shown in FIG. 3 where the through-hole 110 receives belt clip 302. The belt clip 302 is formed to have a corresponding plug-in feature 304 which is insertable into the through-hole 110 and retained by the mechanical interface alignment feature 116. The through-hole 110 being circular provides the ability for the radio housing 102 to pivot easily on a belt to provide flexibility for wearing in various sitting or standing or mobile situations. The ability to plug the belt clip 302 into the through-hole 110 helps maintain a slim radio profile and minimize bulkiness.

Figure 4:
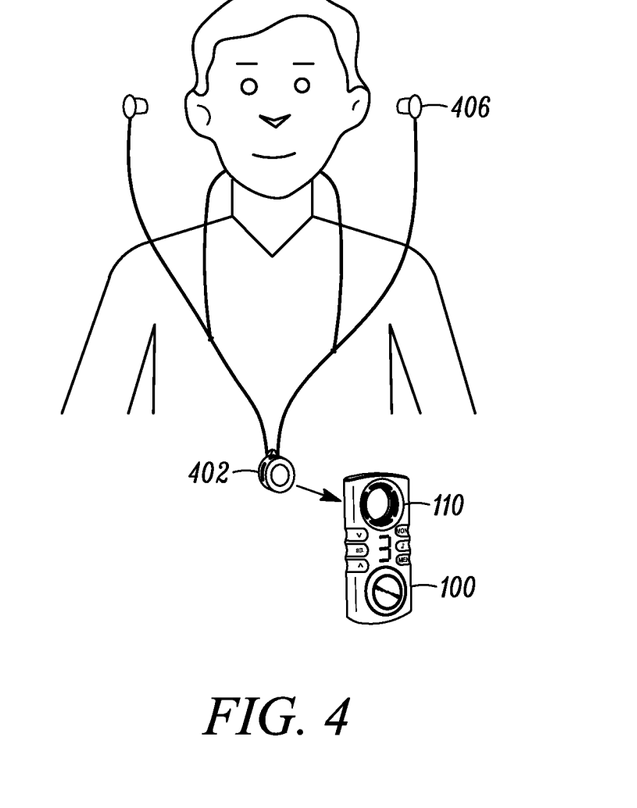
FIG. 4 is the portable two-way radio in accordance with the various embodiments.

FIG. 4 shows an embodiment where the housing 102 comprises through-hole 110 having the electrical interface 114 and mechanical interface 116 on the interior wall of through-hole 110. The accessory shown in this embodiment comprises a connector for physical attachment 402 wired for electrical coupling to an audio accessory 406, such as earphones, ear buds or other type remote audio accessory. This configuration illustrates how the through-hole 110 is capable of accommodating both mechanical lanyard retention capability and electrical earphone interface capability at the same time.

Figure 5:
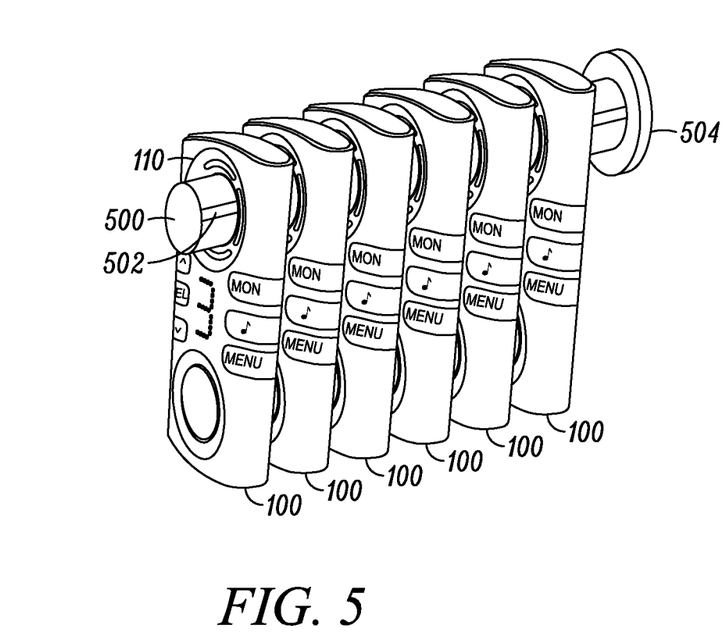
FIG. 5 is the portable two-way radio in accordance with the various embodiments.

FIG. 5 shows a plurality of portable two-way radios, each numbered 100, and each having the through-hole 110 having the electrical and mechanical interface previously described. In this embodiment, the through-hole 110 provides a mounting mechanism for charging the device. Corresponding alignment features 502 on the charging device 500 allows for a polarity of radio devices to be stacked, and for example hung from a wall mount 504. Corresponding electrical contacts on the (not shown) on the charger 500 align with the electrical interface features 114 of each radio 100. Thus the through-hole 110 allows for multiple radios to be charged at one time.

Figure 6:
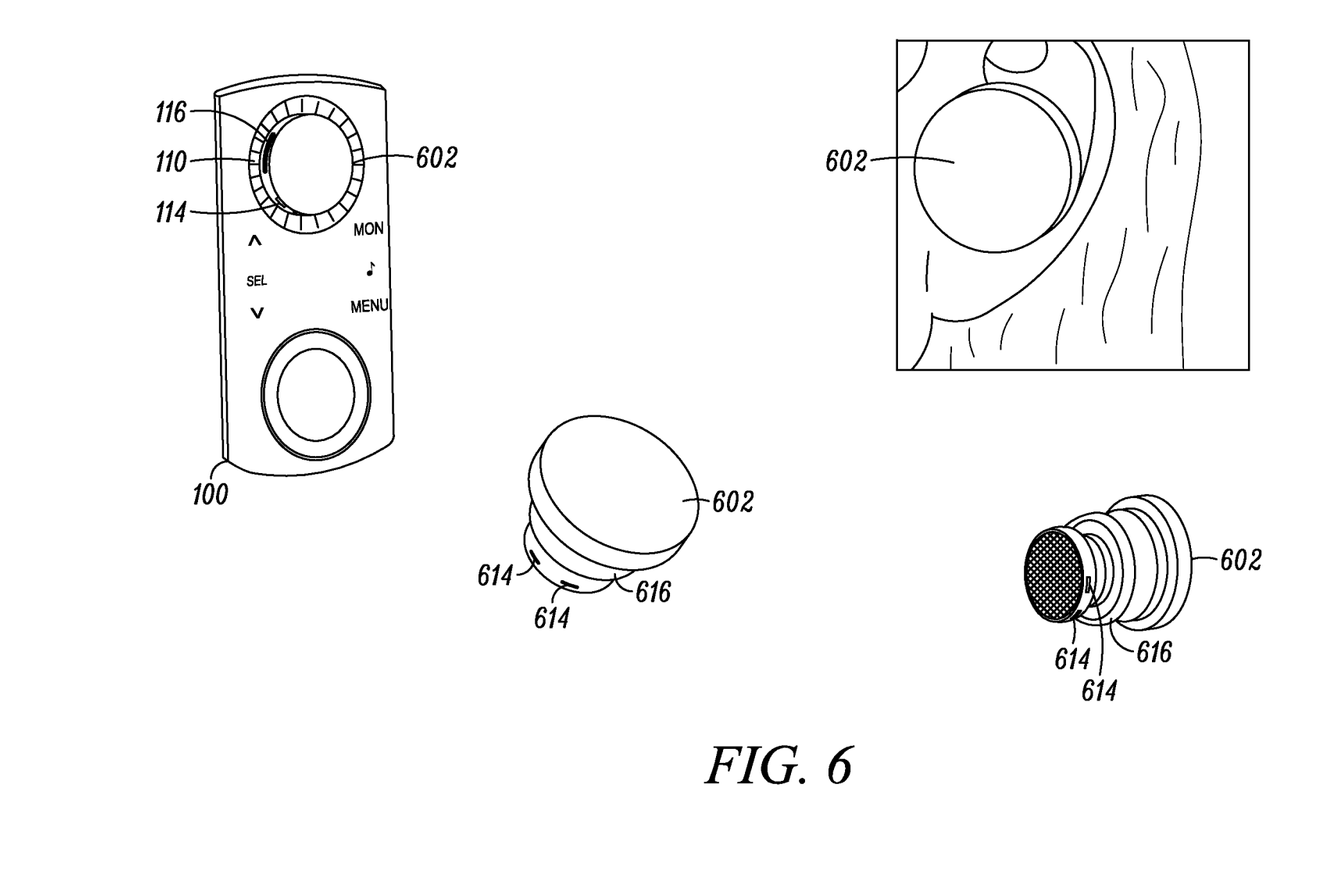
FIG. 6 is the portable two-way radio in accordance with the various embodiments.

FIG. 6 shows the portable radio 100 comprising the through-hole 110 having the mechanical interface 116 and electrical interface 114 respectively providing a mounting mechanism and electrical coupling for a wireless earpiece 602. Wireless earpiece 602 includes a corresponding alignment feature 616, such as a ring, insert, tab, rib or other suitable alignment feature for aligning with mechanical interface alignment feature 116 of through-hole 110. Earpiece 602 further comprises a corresponding electrical interface feature 614, such as contacts, jacks, ports or other suitable feature for electrically coupling to the electrical interface 114 of through-hole 110.

The electrical interface 114 of radio 100 can detect the removal of the wireless earpiece 602 via the separation of the electrical interface 114/614 to activate the wireless interconnect, such as a BLUETOOTH connection, between the two devices. The earpiece 602, which in the past might be easily misplaced due to its size, can now be safely stored in through-hole 110 via the interface alignment feature 116 and electrical interface 114.

The electrical interface 114 of through-hole 110 can be formed of a plurality of different electrical contacts which align with different accessories based upon the physical mounting interface or the electrical contacts may be multiplexed by the radio to provide a plurality of different operational functions. For example, when the earpiece 602 is coupled to the through-hole 110, the radio 100 detects the connection via electrical interface 114 and changes to high audio. Conversely, when the earpiece 602 is removed from the through-hole 110, the radio 100 detects the removal and changes the radio 100 to a muted condition and switches the audio to the earpiece, shown here as wireless but also applies to a wired earpiece. The through-hole 110 having a circular configuration is particularly advantageous as it allows for a variety of electrical and mechanical devices (and combinations of the two) to be accommodated.

Figure 7:
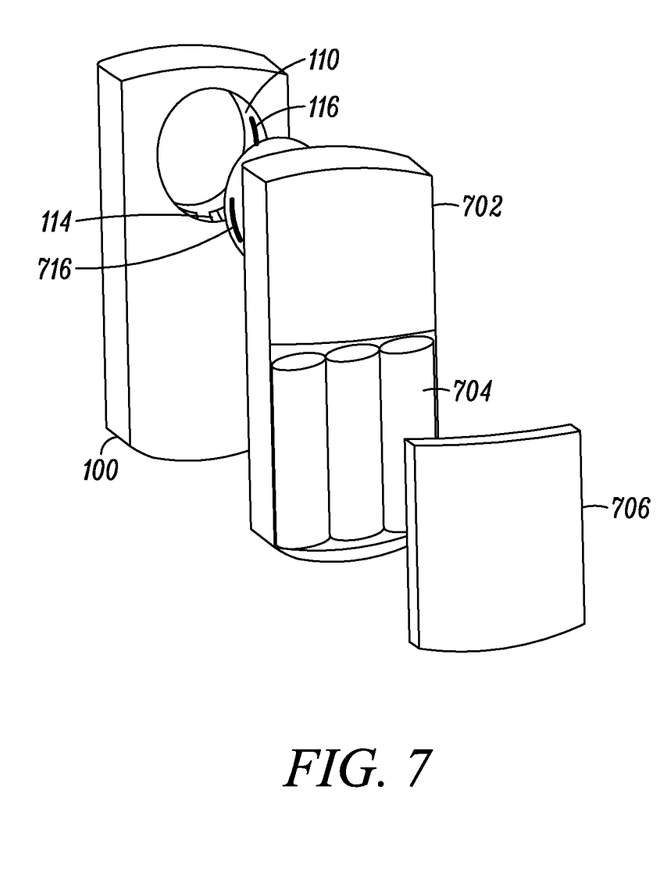
FIG. 7 is the portable two-way radio in accordance with the various embodiments.

FIG. 7 shows the portable radio 100 comprising the through-hole 110 having the mechanical interface 116 and electrical interface 114 providing a mounting mechanism for a secondary battery pack 702. This embodiment shows the battery pack 702 having batteries 704 accessible via cover 706. The secondary battery pack 702 can be mounted via the through-hole 110 by aligning the alignment feature 716 with a corresponding alignment feature on the secondary battery pack and electrically coupling electrical contacts of the secondary battery pack 702 to the electrical interface 114.

Figure 8:
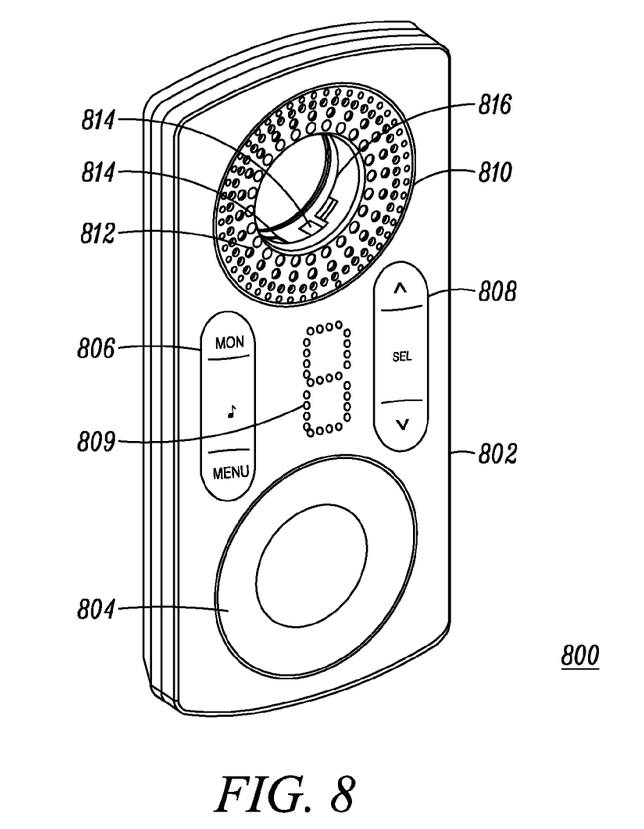
FIG. 8 is a portable two-way radio in accordance with the various embodiments.

FIG. 8 shows another portable radio 800 formed in accordance with the various embodiments. The portable radio 800, such as a handheld two-way radio, comprises a housing 802 which comprises a push-to-talk (PTT) button 804, function keys 806, 808, and a display 809. This embodiment is provided to show that alternative types of audio porting 812, such as audio holes can be used rather than grill porting. The function keys 806, 808 have been placed on the front surface of the housing 802, rather than the sides, again providing for a very thing, flat surface. The portable radio 800, similar to radio 100, comprises a through-hole 810 formed through the housing 802, the through-hole 810 providing an interface for coupling a plurality of interchangeable accessories through electrical interface features 814, such as contacts or other suitable electrical interface and mechanical interface alignment feature 816 in the manner previously described.

Figure 9:
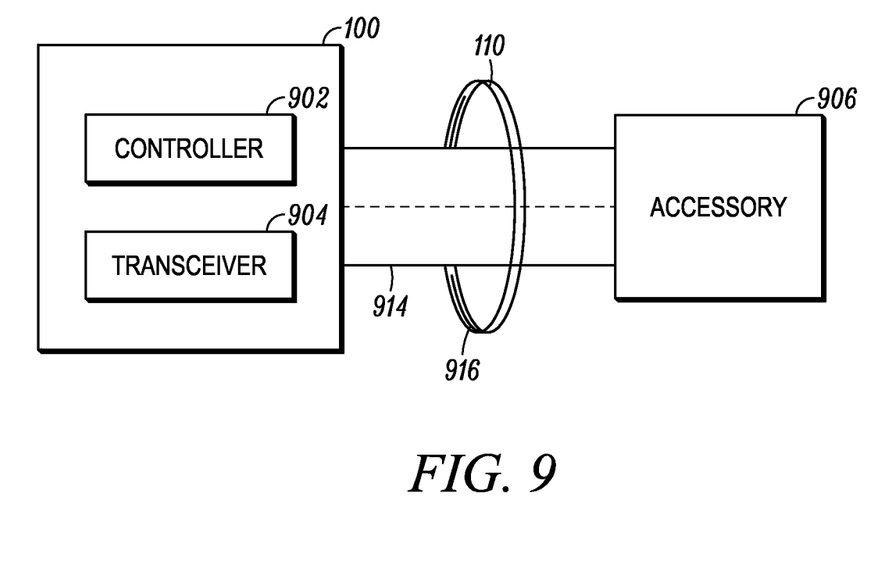
FIG. 9 is a block diagram of a portable radio having an accessory interface in accordance with the various embodiments.

FIG. 9 is a block diagram 900 of a portable radio having an accessory interface in accordance with the various embodiments. The portable radio 100 comprises a controller 902 and a transceiver 904 which provide radio communication, such as two-way radio communication. The portable radio 100 comprises a through-hole 110 formed therein, the through-hole providing the accessory interface. The through-hole 110 comprises mechanical interface feature(s) 912 and electrical interface feature(s) 914 to allow for the selective interchanging of a plurality of different accessories, represented here by accessory 906. The accessory may be an electrical accessory such as an earpiece, battery or charger, previously described, or other accessory formed to align within the through-hole. The through-hole may further accommodate non-electrical accessories (mechanical accessories) such as a belt clip or lanyard to name a few.

In accordance with the various embodiments, the mechanical feature provides retention and removal of the accessory 906 having a corresponding alignment feature. The electrical feature may provide a plurality of electrical interfaces, either through different electrical contacts positioned within the through-hole 110 or through multiplexed contacts. The electrical interface is controlled via controller 902 of radio 100 to detect and control a plurality of different interchangeable accessories. The electrical interfaces may comprise for example, detecting the presence and absence of an accessory mounted within the through-hole 110 and adjusting the radio in response thereto.

Portable radio communication devices, such a portable two-way radio, formed in accordance with the various embodiments may incorporate a variety of diverse operating features, such as LTE, narrowband, Bluetooth, WLAN and as such the organization of the user interface is highly important. All of the embodiments a two-way portable radio having a slim profile, unencumbered by control knobs or an exterior antenna. While the user interface features have been highly integrated into this sleek profile device, the user interface is still very intuitive via the through-hole 110, the large PTT, and front function controls. The mechanical interface may comprise a snap-in/snap-out interface, a twist-in/twist-out interface provided by the alignment feature 116 of interior wall of the through-hole 110 thereby accommodating a variety of accessory devices to be coupled thereto without impacting the overall size or portability of the device.

Accordingly, in accordance with the various embodiments, there has been provided a portable two-way radio with improved user interface. The housing formed in accordance with the various embodiments maintains a logistical user interface that accommodates interchangeable accessories through the use of an electro-mechanical through-hole 110 through the housing. Portable handheld radio products where a plurality of interchangeable interface features need to be incorporated within tight space constraints will benefit greatly from the housing provided by the various embodiments. The incorporation of a through-hole with accessory interface capability in accordance with the various embodiments allows for a radio to have smooth surfaces with minimal protrusions which facilitates the ability to carry the device in a pocket with or without the accessory.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A portable radio, comprising:
    a housing having a through-hole; and
    the through-hole providing an interface for coupling a plurality of interchangeable accessories; and
    audio porting disposed on the housing surrounding the through-hole.

2. The portable radio of claim 1, wherein the through-hole is circular.

3. The portable radio of claim 1, wherein the through-hole has an interior wall formed from a front side of the housing to a back side of the housing, the interior wall having electrical interface feature and a mechanical interface alignment feature disposed thereon for coupling to the plurality of interchangeable accessories.

4. The portable radio of claim 3, wherein the housing comprises a controller for controlling the electrical interface feature and operation of the plurality of interchangeable accessories.

5. The portable radio of claim 1, wherein the interface comprises an electrical and mechanical interface to the plurality of interchangeable accessories.

6. The portable radio of claim 5, wherein the electrical interface feature detects a presence and an absence of an accessory mounted within the mechanical interface of the through-hole, and the portable radio adjusts operation in response thereto.

7. A portable radio comprising:
    a housing having a through-hole;
    the through-hole providing an interface for coupling a plurality of interchangeable accessories;
    and wherein the through-hole within the housing interchangeably accommodates two or more of:
    a belt clip, an earpiece, a speaker, a charger interface, a lanyard, and a battery pack.

8. The portable radio of claim 7, wherein the interface of the through-hole comprises an electro-mechanical interface.

9. A portable radio, comprising:
    a housing having a through-hole;
    the through-hole providing an interface for coupling a plurality of interchangeable accessories;
    and wherein the through-hole provides both mechanical lanyard retention capability and electrical earphone interface capability at the same time.

10. A portable radio having an accessory interface, comprising:
    a portable radio housing having a through-hole formed therein, the through-hole providing the accessory interface, the through-hole comprising electrical interface feature and a mechanical interface feature for selectively interchanging a plurality of different accessories, wherein the electrical interface feature comprises electrical contacts for charging the portable radio.

11. The portable radio having the accessory interface of claim 10, the mechanical interface feature provides for retention and removal of each of the plurality of different accessories, each accessory having a corresponding alignment feature.

12. The portable radio having the accessory interface of claim 11, wherein the electrical interface feature detects for presence and absence of an accessory mounted within the mechanical feature of the through-hole.

13. A portable radio having an accessory interface, comprising:
    a portable radio housing having a through-hole formed therein, the through-hole providing the accessory interface, the through-hole comprising electrical interface feature and a mechanical interface feature for selectively interchanging a plurality of different accessories, wherein the electrical interface feature is multiplexed for operating with a plurality of different interchangeable accessories.

14. The portable radio having the accessory interface of claim 10,
    wherein the electrical interface feature comprises a plurality of contacts each aligning with a different accessory of the plurality of different interchangeable accessories.

15. A portable radio having an accessory interface, comprising:
    a portable radio housing having a through-hole formed therein, the through-hole providing the accessory interface, the through-hole comprising electrical interface feature and a mechanical interface feature for selectively interchanging a plurality of different accessories, wherein the mechanical interface provides a twist-in and twist-out alignment feature or a snap-in and snap-out alignment feature.

16. The portable radio having the accessory interface of claim 10,
wherein the portable radio housing comprises smooth surfaces and is sized to carry in a pocket.

17. The portable radio having the accessory interface of claim 10, wherein the through-hole accommodates electrical accessories and non-electrical accessories.

* * * * *